(12) United States Patent
Wech et al.

(10) Patent No.: US 7,550,689 B2
(45) Date of Patent: Jun. 23, 2009

(54) RESERVOIR ASSEMBLY

(75) Inventors: Michael J. Wech, Manitowoc, WI (US); Carolyn M. Boldt, Manitowoc, WI (US)

(73) Assignee: Oil-Rite Corporation, Manitowoc, WI (US)

( * ) Notice: Subject to any disclaimer, the term of this patent is extended or adjusted under 35 U.S.C. 154(b) by 10 days.

(21) Appl. No.: 11/789,241

(22) Filed: Apr. 24, 2007

(65) Prior Publication Data
US 2007/0284230 A1    Dec. 13, 2007

Related U.S. Application Data

(60) Provisional application No. 60/794,394, filed on Apr. 24, 2006.

(51) Int. Cl.
*H01H 35/00* (2006.01)
(52) U.S. Cl. .................................. 200/61.2; 200/84 R
(58) Field of Classification Search ............... 200/61.2, 200/61.21, 81.6
See application file for complete search history.

(56) References Cited

U.S. PATENT DOCUMENTS

| | | | | |
|---|---|---|---|---|
| 3,631,538 A | * | 12/1971 | Kohn ..................... | 340/568.7 |
| 4,147,906 A | * | 4/1979 | Levine ..................... | 200/61.2 |
| 4,404,441 A | * | 9/1983 | MacLaren ................ | 200/84 C |
| 5,042,300 A | | 8/1991 | Benjey et al. | |
| 5,297,939 A | * | 3/1994 | Orth et al. ..................... | 417/40 |
| 5,814,780 A | * | 9/1998 | Batchelder et al. ........ | 200/84 R |
| 6,069,331 A | * | 5/2000 | Utke ........................ | 200/84 R |
| 6,089,086 A | | 7/2000 | Swindler et al. | |
| 6,446,506 B1 | | 9/2002 | VanZuilen | |

OTHER PUBLICATIONS

Oil-Rite Corporation Catalog, Dated 1998; pp. 2 and 3.

* cited by examiner

*Primary Examiner*—Elvin G Enad
*Assistant Examiner*—Lheiren Mae A Anglo
(74) *Attorney, Agent, or Firm*—Ryan Kromholz & Manion, S.C.

(57) ABSTRACT

A reservoir assembly is disclosed including a one-piece integrally formed fluid level switch housing and outlet wherein the switch housing can be rotated 360 degrees about its longitudinal axis to locate the outlet at any desired position. A conventional fitting may be integrally formed at the outlet. The orientation of the outlet may be changed at any time after the manufacturing process.

11 Claims, 4 Drawing Sheets

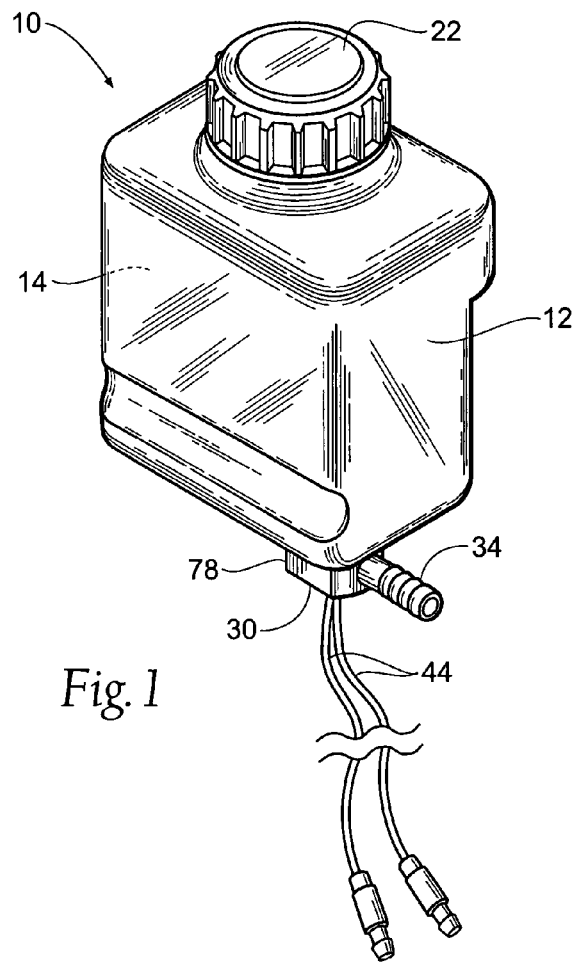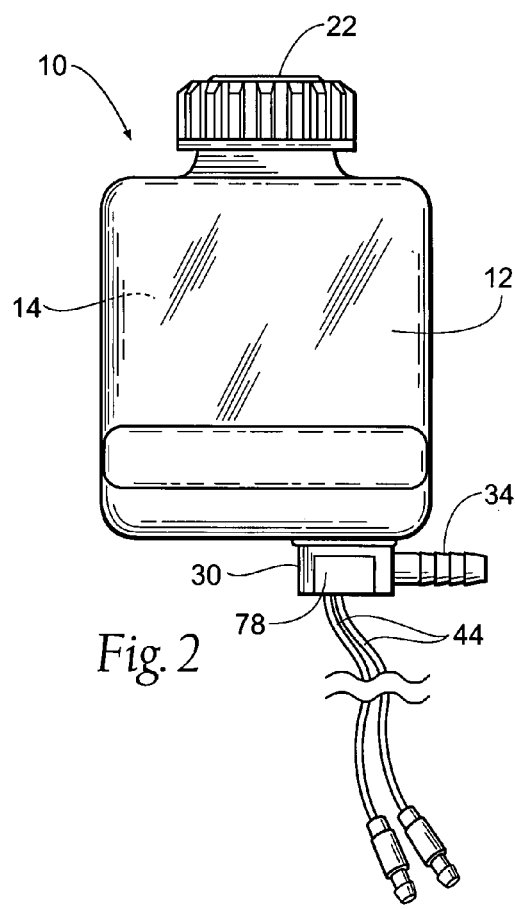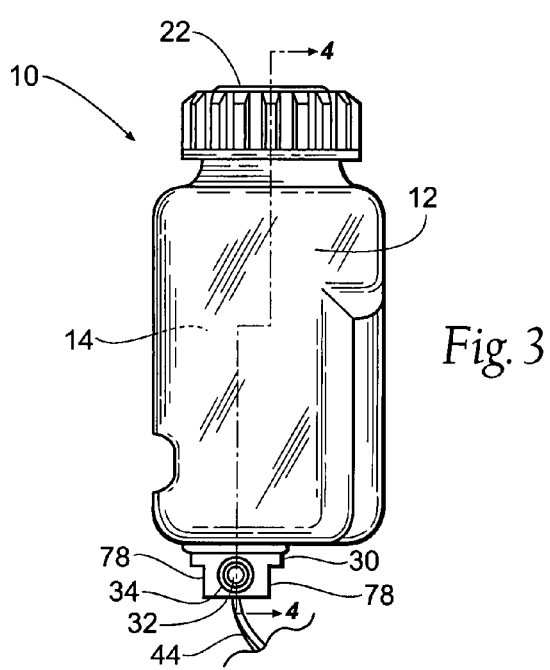

RESERVOIR ASSEMBLY

RELATED APPLICATION

This application claims the benefit of U.S. Provisional Patent Application Ser. No. 60/794,394, filed 24 Apr. 2006.

BACKGROUND OF THE INVENTION

The present invention relates to fluid reservoirs and specifically to reservoir assemblies including switches for making or breaking an electrical signal based upon the fluid level in the reservoir. In many applications, it is desirable to monitor the level of fluid in a reservoir. Furthermore, it is desirable to make or break an electrical signal when the amount of fluid in the reservoir drops to a predetermined level.

In the design of prior art reservoir assemblies, it was necessary to determine the position of the reservoir outlet fitting during the assembly of the reservoir assembly. Once positioned in the prior art design, the orientation of the outlet fitting is fixed and can not be changed. This results in the necessity of manufacturing and stocking a variety of reservoir assemblies, each having a different position for the outlet fitting. There exists a need for a reservoir assembly where the position or orientation of the outlet fitting can be easily changed after the reservoir assembly is manufactured thereby eliminating the need to manufacture and stock multiple reservoir assemblies each having a different outlet fitting position.

Prior art reservoir assemblies also utilize switch housings made from multiple components that must be securely connected to one another. This is typically accomplished with adhesives, press fits and threaded connections. The various components are also commonly formed from different materials. The resulting switch housing is not only costly to manufacture, but also provides a number of areas where the connection could fail thus leading to a fluid leak. There also exists a need for a one-piece integrally formed switch housing for use in a reservoir assembly.

SUMMARY OF THE INVENTION

The present invention includes a reservoir defining an interior volume and having opposed upper and lower openings. The upper opening receives a removable fillcap and provides a means for filling the reservoir with a fluid. The lower opening receives a one-piece integrally formed switch housing that serves dual purposes. It provides the fluid outlet and the housing for the fluid level switch.

The fluid outlet includes an elongate fitting having an internal passageway leading from the interior of the reservoir to the distal end of the fitting. The fitting may be an integrally formed barbed fitting suitable for the attachment of flexible tubing, a hose or the like.

The fluid level switch housing includes a tubular stem member within which is located a metallic reed switch and a float having a magnet integrally formed therein or attached thereto. The tubular stem member includes an integrally formed top and at least one integrally formed flexible tab. The float is slidably engaged with the tubular stem member, and is retained on the stem member by the tab. When the float and magnet assembly drop to a predetermined position along the tubular member, the magnetic forces from the close proximity of the magnet cause the reeds of the reed switch to contact and therefore close the electrical circuit to which the switch is connected.

The switch housing is rotatably sealed within the lower reservoir opening thereby allowing the user to rotate the fluid outlet fitting 360 degrees about the longitudinal axis of the switch housing. Unlike the prior art designs whereby the position of the outlet fitting must be determined during the manufacturing process, the fluid outlet of the present invention can be rotated about it axis at any time and to any desired position.

BRIEF DESCRIPTION OF THE DRAWINGS

FIG. 1 is a perspective view of the reservoir assembly.
FIG. 2 is a front elevation view thereof.
FIG. 3 is a right side elevation view thereof.

DESCRIPTION OF THE PREFERRED EMBODIMENT

Figure 4:
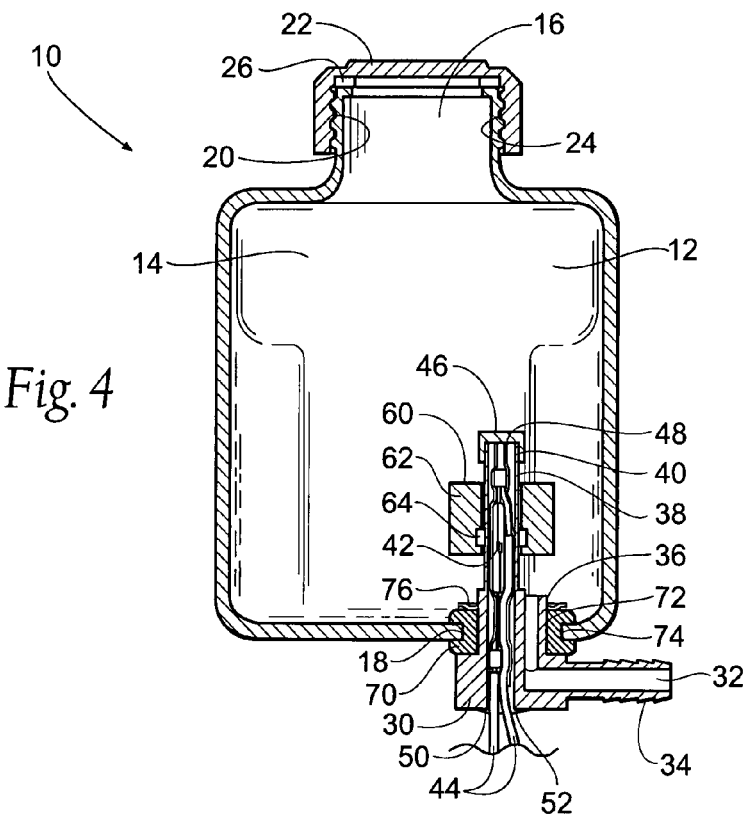
FIG. 4 is a cutaway view taken along line 4-4 in FIG. 3.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention.

Referring now to FIGS. 1, 2, 3 and 4 the reservoir assembly of the present invention will be designated generally with the reference numeral 10. The assembly 10 includes a reservoir 12 having an interior volume 14, an upper opening 16 and a lower opening 18. The reservoir 12 can have any shape or size and be constructed from any material. In the preferred embodiment, the reservoir 12 has generally rectangular top, bottom and side walls and is constructed from a suitable plastic material such as polypropylene. A mating thread 20 is formed at the upper opening 16 for receiving a cap 22 having threads 24. A gasket 26 may be placed between the uppermost end of reservoir 12 and cap 22. Cap 22 may have a valve located therein, such as a silicone umbrella valve, if desired.

Referring specifically to FIG. 4, a one-piece integrally formed switch housing 30 is located within the lower opening 18. The switch housing 30 includes a fluid communication channel or conduit 32, a barbed fitting 34, a cylindrical body portion 36, and a hollow stem portion 38 having a hollow interior chamber 40. The fluid conduit 32 is in fluid communication with the interior volume 14 of the reservoir 12 and terminates at the distal end of the barbed fitting 34 thereby allowing the fluid contained within the reservoir 12 to flow there through. The integrally formed barbed fitting 34 is of a conventional design to allow for the connection of flexible tubing, hose or the like.

An electrical reed switch 42, having lead wires and conventional connectors 44, is located within the hollow chamber 40 formed within the stem 38. After the reed switch 42 is placed within the hollow chamber 40, a cap 46 having a fluid tight seal is placed on the uppermost end 48 of the stem 38. Potting compound 52 is introduced into the opposite end 50 to secure the reed switch 42 within the hollow chamber 40 and prevent the introduction of any contaminants into the chamber 40 as well. The lead wires 44 pass through the end 50 and are also sealed in place by the potting compound 52.

An annular float assembly 60 is positioned about the stem 38. The float assembly includes a float 62 and a magnet 64. The float 62 is constructed from any suitable material that is buoyant when exposed to the fluid contained within the reservoir 12. The magnet is attached to the float. When the reservoir 12 is sufficiently full of fluid, the float 62 will be located at its uppermost position, whereby further upward movement is restrained by the cap 46. As the level of fluid within the reservoir 12 begins to decrease, the position of the float assembly 60 will drop or lower along the stem 38. At a preselected point, the magnet 64 of the float assembly 60 will be positioned substantially adjacent to the reed switch 42. The magnetic force generated by the magnet 64 within the close proximity to the reed switch 42 will cause the reed switch 42 to close thereby completing the circuit to which the wire leads 44 are connected. As will be appreciated, it is within the scope of the present invention to utilize a reed switch 42 that is opened by the presence of the magnetic forces generated by the magnet 64 thereby opening the circuit to which the wire leads 44 are connected.

The switch housing 30 is held in a fluid tight connection with the reservoir 12 by the use of a seal such as a rubber grommet 70 and retaining mechanism such as an external self-locking retaining ring 76. The inner diameter 72 of grommet 70 creates a fluid tight seal about the cylindrical body portion 36 of the switch housing 30. The outer periphery 74 of the grommet 70 fits about the lower opening 18 of the reservoir 12 as shown in FIG. 4 and again provides a fluid tight seal. This arrangement also allows the user of the reservoir assembly 10 to rotate the switch housing 30 within opening 18 and about the longitudinal axis of the switch stem 38 to position the barbed fitting 34 at any desired location relative to the position of the reservoir 12.

Figure 5:
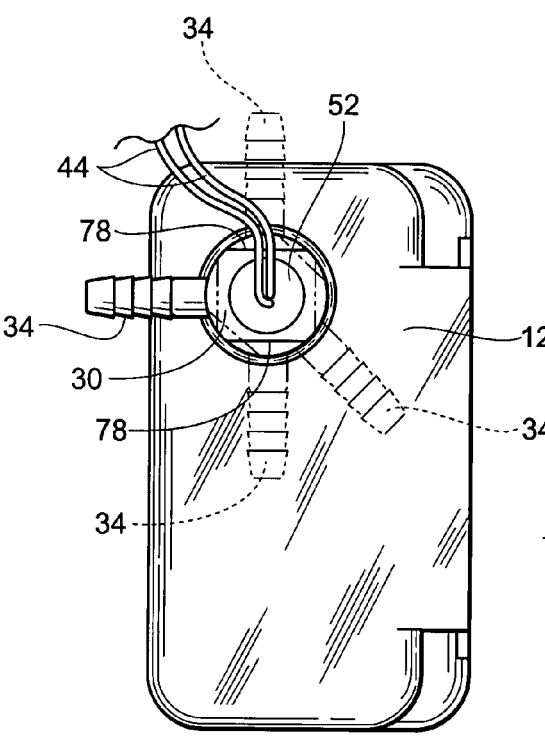
FIG. 5 is a bottom plan view.

As best shown in FIG. 5, once assembled the user can rotate the switch housing 30 360 degrees about the longitudinal axis of the stem 38 to position the barbed fitting 34 in any desired location. A pair of substantially parallel flat surfaces 78 (see also FIGS. 1, 2, and 3) are formed in the switch housing 30 adjacent the integrally formed barbed fitting 34 to allow the placement of a wrench or similar tool (not shown) on the housing 30 to aid with the rotational positioning of the barbed fitting 34.

The reservoir assembly 10 is typically constructed as follows. First, the rubber grommet 70 is placed in lower opening 18. Then, the switch housing 30 (including the reed switch 42 affixed thereto) is passed through the inner diameter 72 of grommet 70. Next, the retaining ring 76 is attached to a tool (not shown) that is passed through upper opening 16. The tool allows the user to position the retaining ring 76 about the cylindrical body portion 36 of the switch housing 30. The retaining ring 76 is depressed onto the cylindrical body portion 36 until it rests against the grommet 70. Using another suitable tool (not shown) the float assembly 60 is placed over the stem 38 and the cap 46 is sealed to the uppermost end 48 of the stem 38. Finally, the threaded cap 22 is placed on the threaded fitting 20 at upper opening 16 and rotated until secure.

An alternate embodiment of the reservoir assembly 110 of the present invention is shown in FIGS. 6 through 10. The alternate embodiment of the reservoir assembly is similar to the previously described embodiment, but incorporates an alternate cap 122 and an alternate switch housing 130.

Figure 6:
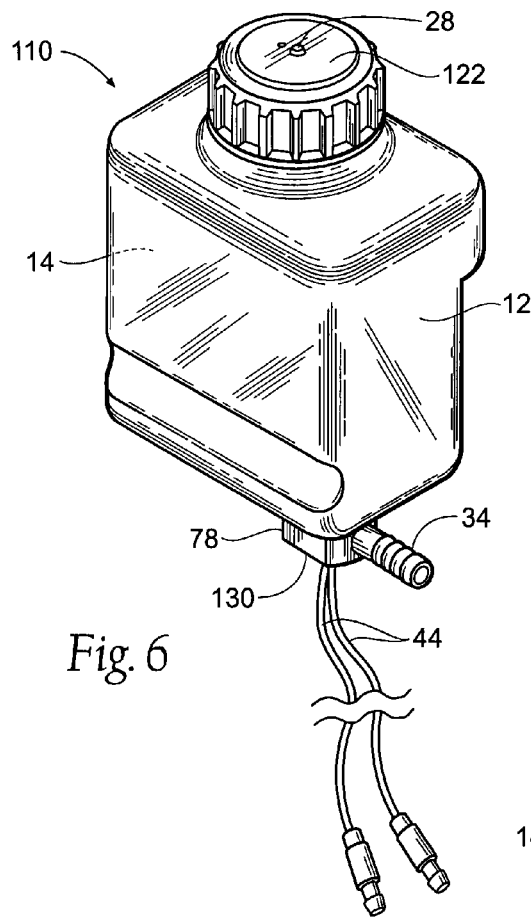
FIG. 6 is a perspective view of the preferred embodiment of the reservoir assembly.
Figure 7:
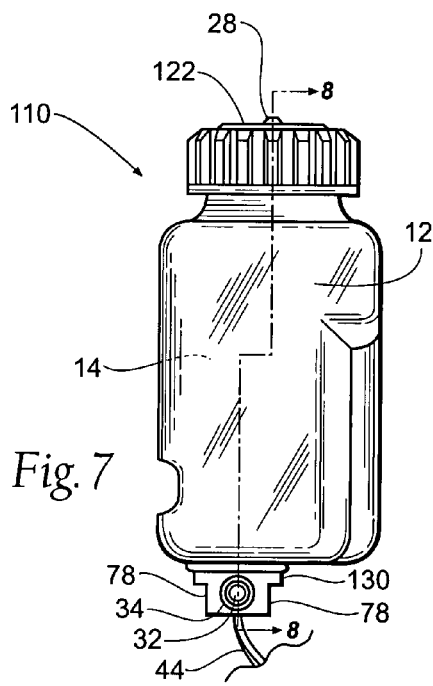
FIG. 7 is a right side elevation view of the reservoir assembly of FIG. 6.
Figure 8:
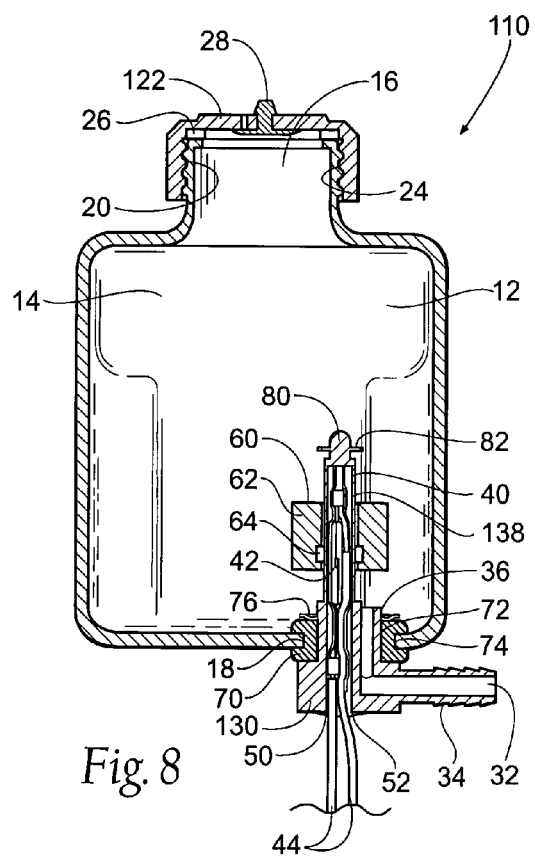
FIG. 8 is a cutaway view taken along line 8-8 in FIG. 7.

As shown in FIG. 8, the reservoir assembly 110 includes a reservoir 12 having an interior volume 14, an upper opening 16, and a lower opening 18. As described above, the reservoir 12 can have any shape and be constructed from any material. In the preferred embodiment, the reservoir 12 has generally rectangular top, bottom, and side walls and is constructed from suitable plastic material such as polypropylene. A matting threaded portion 20 is formed at the upper opening 16 for receiving a cap 122 having threads 24. A gasket 26 may be placed between the uppermost end of reservoir 12 and cap 122. As shown in FIGS. 6 and 8, the cap 122 may have a valve 28 located therein, such as a silicone umbrella valve 28, if desired.

As shown in FIG. 8, a one-piece integrally formed switch housing 130 is located within the lower opening 18 of the reservoir 12. The switch housing 130 includes a fluid communication channel or conduit 32, a barbed fitting, 34, a cylindrical body portion 36, and a hollow stem portion 138 having a hollow interior chamber 40. The fluid conduit 32 is in fluid communication with the interior volume 14 of the reservoir 12 and terminates at the distal end of the barbed fitting 34 thereby allowing the fluid contained within the reservoir 12 to flow therethrough. The integrally formed barbed fitting 34 is preferably of a conventional design to allow for the connection of flexible tubing, hose, or the like.

As shown in FIG. 8, the cylindrical body portion 138 has an integrally formed top 80. The top 80 can be of any shape; however in the preferred embodiment the top 80 is spherically shaped. The cylindrical body 138 is further formed with at least one integral tab 82. It is contemplated that any number or configuration of tabs 82 could be utilized. In the preferred embodiment, the cylindrical body 138 is formed with two integral tabs 82 (see FIG. 8). The tabs 82 preferably extend radially outwardly from the cylindrical body 138 in diametrically opposed directions. The tabs 82 are preferable resiliently flexible, such that the tabs can be flexed (see FIG. 9) and will return to generally their original position (see FIG. 8).

Figure 9:
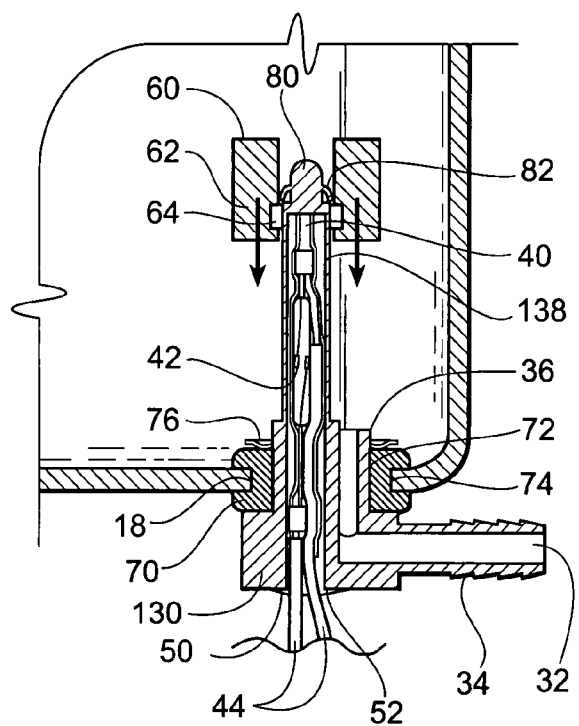
FIG. 9 is an enlarged view of a portion of FIG. 8.

As shown in FIGS. 8 and 9, an electrical reed switch 42, having lead wires and conventional connectors 44, is located within the hollow chamber 40 formed within the stem 138. After the reed switch 42 is placed within the hollow chamber 40, potting compound 52 is introduced into the opposite end 50 to secure the reed switch 42 within the hollow chamber 40 and prevent the introduction of any contaminants into the chamber 40 as well. The lead wires 44 pass through the end 50 and are also sealed in place by the potting compound 52.

As shown in FIG. 8, an annular float assembly 60 is positioned about the stem 138. The float assembly includes a float 62 and a magnet 64. The float 62 is constructed from any suitable material that is buoyant when exposed to the fluid contained within the reservoir 12. The magnet 64 is attached to the float 62. When the reservoir 12 is sufficiently full of fluid, the float 62 will be located at its uppermost position, whereby further upward movement is restrained by the tabs 82. As the level of fluid within the reservoir 12 begins to decrease, the position of the float assembly 60 will drop or lower along the stem 138. At a preselected point, the magnet 64 of the float assembly 60 will be positioned substantially adjacent to the reed switch 42. The magnetic force generated by the magnet 64 within the close proximity to the reed switch 42 will cause the reed switch 42 to close thereby completing the circuit to which the wire leads 44 are connected. As will again be appreciated, it is within the scope of the present invention to utilize a reed switch 42 that is opened by the presence of the magnetic forces generated by the magnet 64 thereby opening the circuit to which the wire leads 44 are connected.

As shown in FIGS. 8 and 9, the switch housing 130 is held in a fluid tight connection with the reservoir 12 by the use of a seal such as a rubber grommet 70 and retaining mechanism such as an external self-locking retaining ring 76. The inner diameter 72 of grommet 70 creates a fluid tight seal about the cylindrical body portion 136 of the switch housing 130. The outer periphery 74 of the grommet 70 fits about the lower opening 18 of the reservoir 12 as shown in FIG. 8 and again provides a fluid tight seal. This arrangement also allows the user of the reservoir assembly 110 to rotate the switch housing 130 within opening 18 and about the longitudinal axis of the switch stem 138 to position the barbed fitting 34 at any desired location relative to the position of the reservoir 12.

Figure 10:
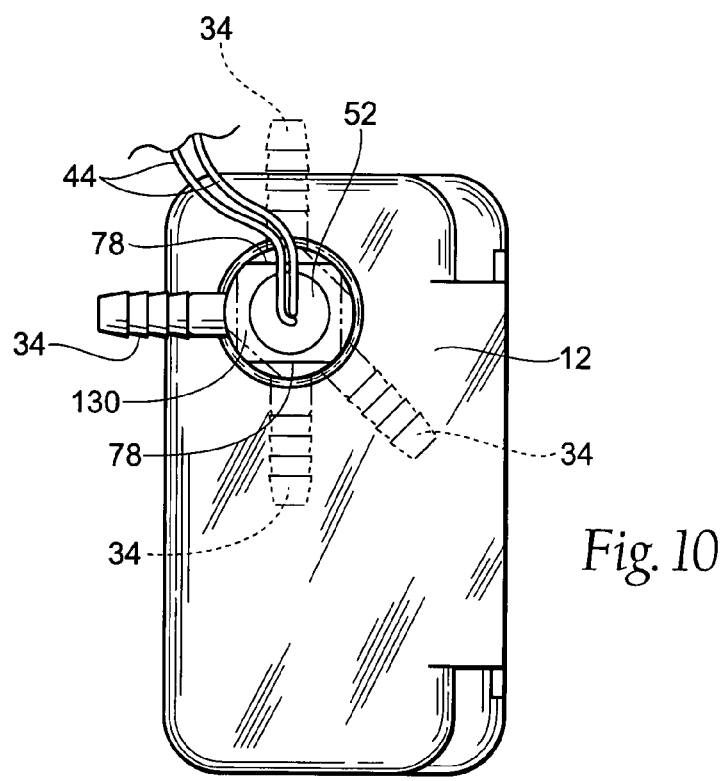
FIG. 10 is a bottom plan view of the reservoir assembly of FIG. 6.

As best shown in FIG. 10, once assembled the user can rotate the switch housing 130 360 degrees about the longitudinal axis of the stem 138 to position the barbed fitting 34 in any desired location. A pair of substantially parallel flat surfaces 78 are formed in the switch housing 130 adjacent the integrally formed barbed fitting 34 to allow the placement of a wrench or similar tool (not shown) on the housing 130 to aid with the rotational positioning of the barbed fitting 34.

The reservoir assembly 110 is typically constructed as follows. First, the rubber grommet 70 is placed in lower opening 18. Then, the switch housing 130 (including the reed switch 42 affixed thereto) is passed through the inner diameter 72 of grommet 70. Next, the retaining ring 76 is attached to a tool (not shown) that is passed through upper opening 16. The tool allows the user to position the retaining ring 76 about the cylindrical body portion 36 of the switch housing 130. The retaining ring 76 is depressed onto the cylindrical body portion 136 until it rests against the grommet 70. Using another suitable tool (not shown) the float assembly 60 is placed over the stem 138. As described above, the tabs 82 are flexible, such when the float assembly 60 is pushed onto the stem 138, the tabs 82 temporarily flex to allow the float assembly 60 to pass over the tabs 82 (see FIG. 9). After the float assembly 60 has cleared the tabs 82, the tabs 82 return to their original, unflexed position (see FIG. 8). Finally, the threaded cap 122 is placed on the threaded fitting 20 at upper opening 16 and rotated until secure.

It is also contemplated that the float assembly 60 could be manually removed from the stem 138 in the event maintenance is required. In order to remove the float assembly 60, the float is simply pulled upward towards the top 80 of the stem 138. The tabs 82 will flex to allow the float assembly 60 to be moved past the tabs 82. When the float assembly 60 has passed the tabs 82, the tabs 82 will return to their unflexed configuration. It is therefore contemplated that the tabs 82 should be sufficiently rigid such that the normal pressure of the float assembly 60 engaging the tabs 82 during use of the reservoir will not cause the tabs 82 to flex significantly. However, the tabs 82 must also be flexible, such that the tabs 82 can flex under a removal or insertion from applied by the float assembly 60.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention.

We claim:

1. A reservoir assembly comprising:
   a reservoir tank, the reservoir tank having opposed upper and lower openings;
   a removable fillcap, the fillcap removably coupled to the reservoir tank at the upper opening;
   a switch housing, the switch housing being rotatably and coaxially positioned in the lower opening of the reservoir tank;
   fluid sealing means interposed between said switch housing and said lower opening;
   a fluid level switch associated with the switch housing, the switch housing being able to rotate 360 degrees relative to the axis of said lower opening; and
   a float, the float including an aperture through which a tubular stem member coaxially extends.

2. A reservoir assembly according to claim 1 wherein the float includes a magnet.

3. A reservoir assembly according to claim 2 wherein the float is slidably coupled longitudinally relative to the tubular stem.

4. A reservoir assembly according to claim 3 wherein the float is slidable between a first position and a second position.

5. A reservoir assembly according to claim 1 wherein the tubular stem member includes at least one radially extending flexible tab, said tab adapted to flex downwardly during insertion of said apertured float externally of said stem, and further, said tab being adapted to flex upwardly to normal radially extended unflexed position for retention of said float assembly relative to said stem member.

6. A reservoir assembly according to claim 5 wherein the at least one radially extending tab is integrally formed to the tubular stem member.

7. A reservoir assembly according to claim 1 wherein the fluid sealing means comprises an annular grommet.

8. A reservoir assembly according to claim 1 wherein the switch housing includes a tubular stem member.

9. A reservoir assembly according to claim 1 wherein the fluid level switch further comprises a metallic reed switch disposed within the tubular stem member.

10. A reservoir assembly comprising:
    a reservoir tank, the reservoir tank having opposed upper and lower openings;
    a removable fillcap, the fillcap removably coupled to the reservoir tank at the upper opening;
    a switch housing, the switch housing being rotatably and coaxially positioned in the lower opening of the reservoir tank;
    a fluid level switch associated with the switch housing, the switch housing being able to rotate 360 degrees relative to the axis of said lower opening; and
    wherein the switch housing includes an elongate fitting having an internal passageway leading from the interior of the reservoir to a distal end of the fitting.

11. A reservoir assembly according to claim 10 wherein the elongate fitting is a barbed fitting.

\* \* \* \* \*